July 25, 1944.  C. A. JOHNSON  2,354,462

ICE HOISTING APPARATUS

Filed Sept. 27, 1943  3 Sheets-Sheet 1

Inventor

Carl A. Johnson

By Ritter, Mechlin & Muir

His Attorneys

July 25, 1944.　　　C. A. JOHNSON　　　2,354,462
ICE HOISTING APPARATUS
Filed Sept. 27, 1943　　　3 Sheets-Sheet 2

Inventor
Carl A. Johnson
By Ritter, Mechlin & Muir
his Attorneys

July 25, 1944.  C. A. JOHNSON  2,354,462
ICE HOISTING APPARATUS
Filed Sept. 27, 1943   3 Sheets-Sheet 3
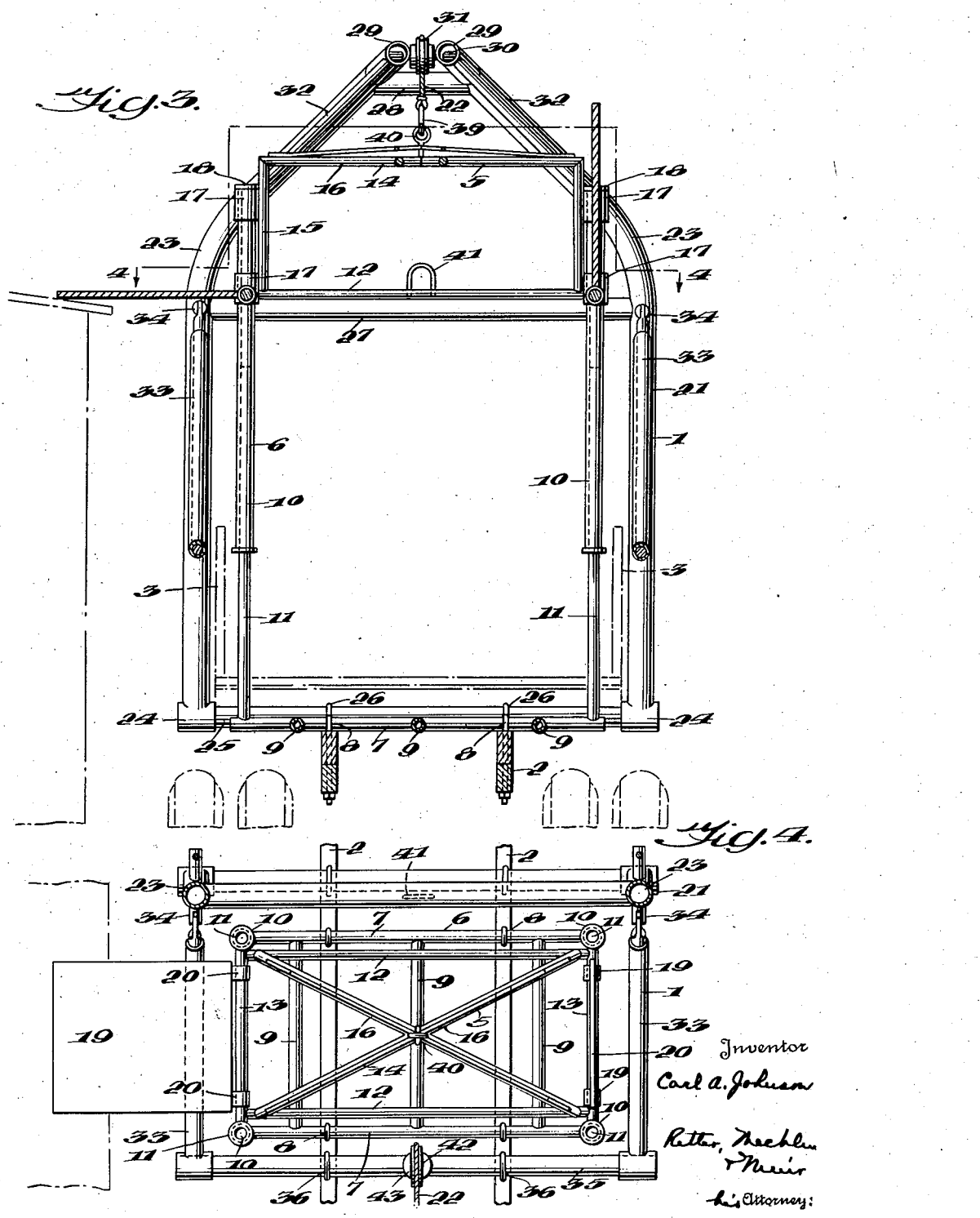

Patented July 25, 1944

2,354,462

UNITED STATES PATENT OFFICE 2,354,462

ICE HOISTING APPARATUS

Carl A. Johnson, Fort Worth, Tex.

Application September 27, 1943, Serial No. 503,982

6 Claims. (Cl. 214—75)

My invention relates to portable ice hoisting apparatus and it has for its principal object the provision of simple and rugged ice hoisting apparatus which is capable of being easily mounted upon an automobile truck for use in connection with the icing of railroad refrigerator cars.

A primary feature of the invention consists in providing a portable ice hoisting apparatus with a plurality of tubular members which are slidably mounted on upright members rigid with an automobile truck and on which the ice elevating device is slidably mounted whereby after the elevating device has been raised to the height of the tubular members they are caused to move upwardly with the elevating device.

Another feature of the invention consists in providing the ice hoisting apparatus with a boom which is pivotally mounted on the automobile truck and serves as a support for power operated flexible means for raising the ice elevating device, a pair of telescoping members being pivotally mounted on each side of the truck for supporting the boom in a substantially vertical position adjacent the ice elevating device.

Other and more specific features of the invention, residing in advantageous forms, combinations and relations of parts, will hereinafter appear and be pointed out in the claims.

In the drawings,

Figure 3 is a vertical transverse sectional view of the apparatus with the elevator in raised position.

Figure 4 is a horizontal sectional view of the apparatus taken on line 4—4 of Figure 3.

Figure 1:
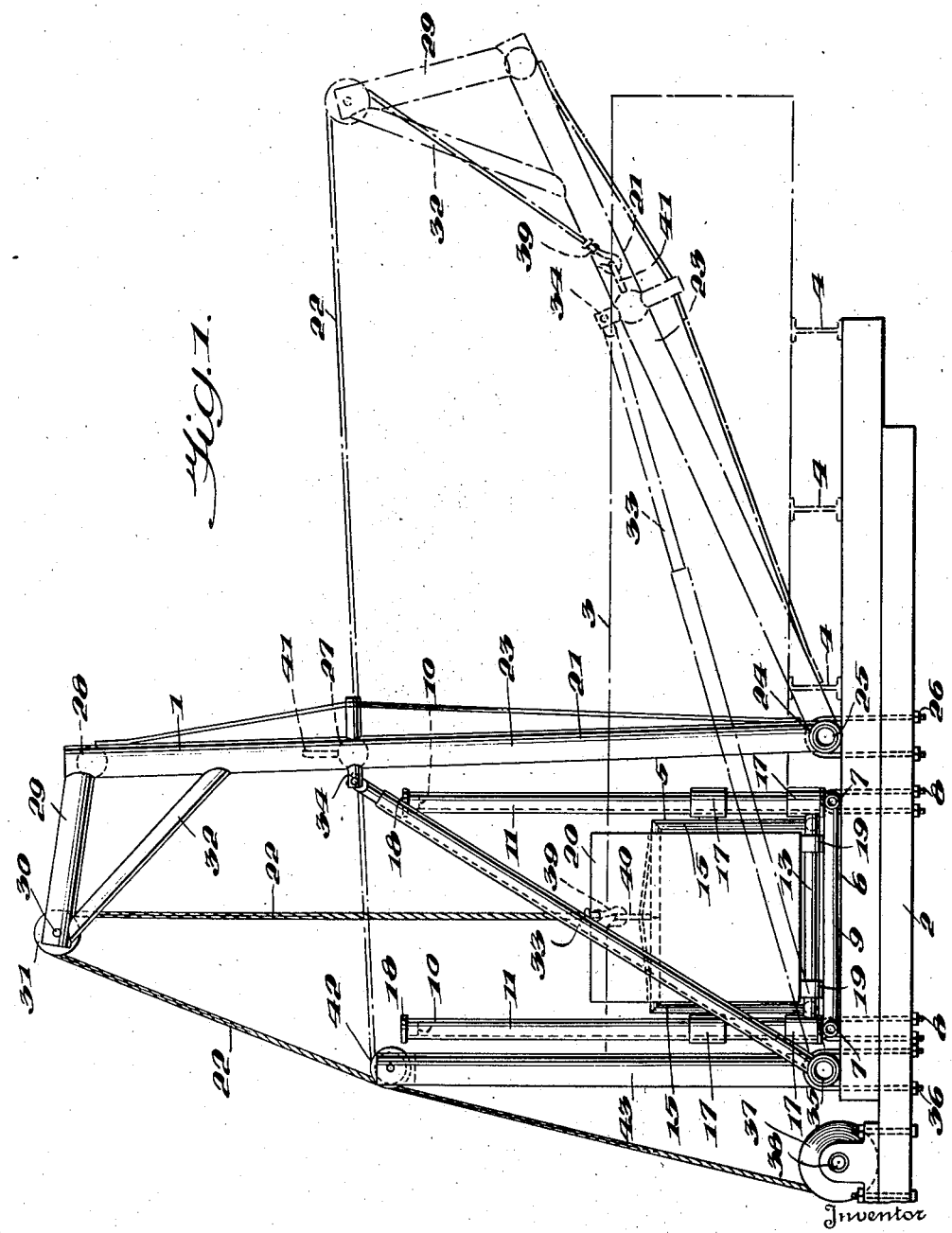
Figure 1 is a side elevational view of the ice hoisting apparatus.

Referring more particularly to the drawings, the ice hoisting apparatus generally designated by the reference numeral 1 is illustrated as mounted upon the frame 2 of an automobile truck, the body 3 of which as well as the transverse supporting members 4 are shown in dot and dash lines.

Rigidly mounted on the frame 2 for vertically guiding the elevator or lift 5 of the hoisting apparatus is a unit 6 comprising two laterally spaced members 7 which extend transversely of the truck frame and may be fastened thereto by U bolts 8. The transverse members are preferably connected intermediate their ends by a plurality of members 9 which extend longitudinally of the truck. Rigid with and extending upwardly from each end of the transverse members 7 is an upright rod or the like 10 on which is slidably mounted a tubular member or sleeve 11.

The elevator 5, which like the guiding unit 6 may be principally formed of sections of pipe has a base comprising transversely extending members 12 which are rigidly connected at their ends by longitudinally extending members 13. Planks or other suitable members (not shown) may be mounted on this base of the elevator to provide a floor on which the ice or other material to be hoisted may rest. Connected to the corners of the base of the elevator is a frame or the like 14 which affords convenient means to which mechanism for raising the elevator may be advantageously attached. This lifting or raising frame of the elevator preferably consists of upright members 15 which are joined together at their upper ends by diagonally extending members 16 which are advantageously connected, as by welding, to each other at their point of intersection.

Figure 2:
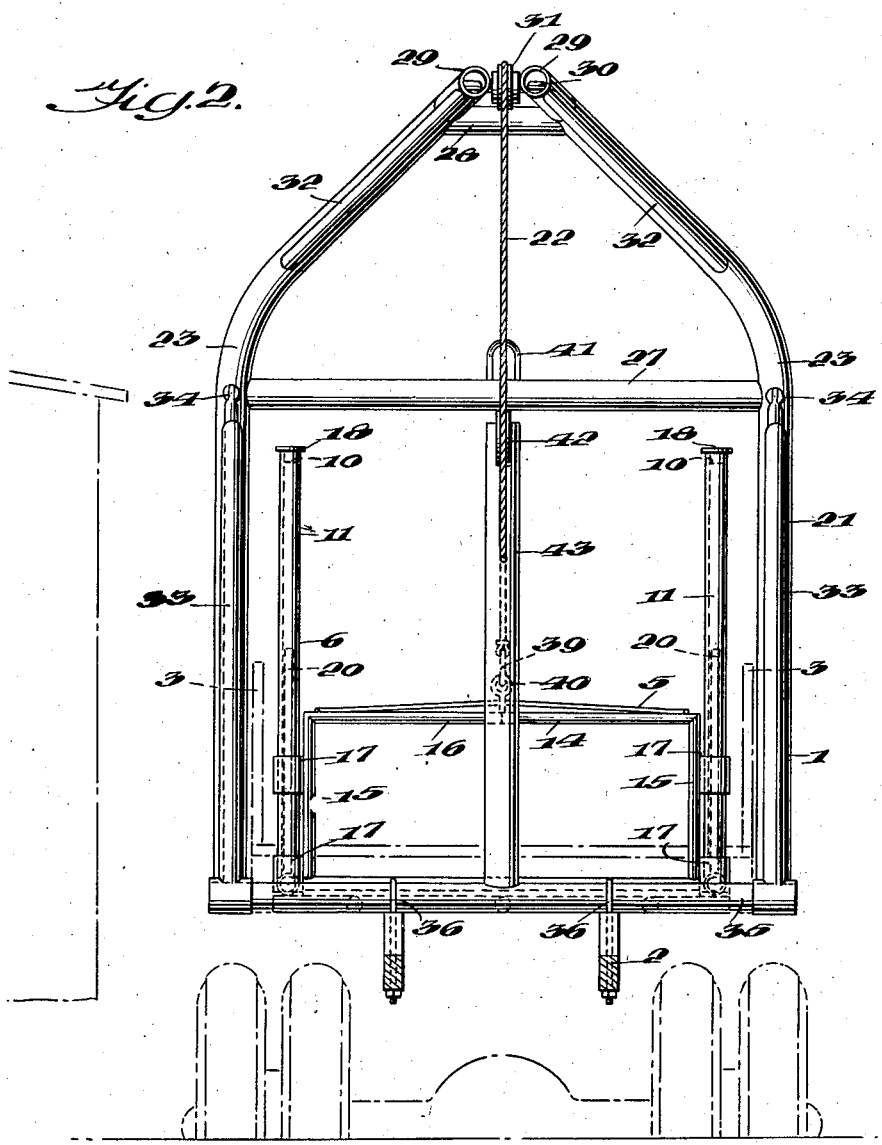
Figure 2 is an end view of the apparatus as viewed from the left hand side of Figure 1.

Secured to each of the upright members 15 of the lifting frame 14 of the elevator is a plurality of sleeves or collars 17 which slidably encircle the adjacent tubular member 11 of the guiding unit 6 and thus function to guide the elevator during its upward and downward movement. In raising the elevator from its lower position as shown in Figures 1 and 2, the collars 17 slide along the tubular members 11 until the upper ones of the collars engage the flanges or other suitable abutments 18 at the upper ends of the tubular members whereupon continued upward movement of the elevator causes the tubular members to move upwardly with respect to the upright rods 10. It will thus be seen that means is provided for guiding the elevator to a height considerably above the position normally occupied by the guiding members.

Pivoted to each side of the elevator, as by collars or rings 19 encircling the longitudinal members 13, is means 20 constituting an extension of the platform of the elevator over which material on the elevator may be transferred. The extensions are of such length as to bridge the space between the elevator and a railroad refrigerator car shown in dot and dash lines in Figures 3 and 4 or between other places to which it is desired to transfer the material on the elevator. When the elevator is in its lowest position, the extensions 20 occupy substantially vertical positions just inside the sides of the truck body as shown in Figure 2 but as soon as the elevator is raised to a point above the tops of the sides of the truck body the extensions are free to be moved outwardly.

A boom 21 is pivotally mounted on the truck frame for supporting power operated flexible means 22 for raising the elevator. The boom comprises two upright members 23 which are provided at their lower ends with sleeves or collars 24 which rotatably encircle a transverse shaft 25 secured to the frame of the automobile truck in any suitable manner such as by U bolts 26. The upper portions of the upright members 23 converge inwardly and are rigidly connected by two transverse members 27 and 28.

Projecting forwardly from the upper ends of the upright members 23 are a pair of arms 29 which afford a support for a shaft 30 on which a pulley 31 for supporting the flexible means 22 is mounted. Arms 29 may be conveniently braced by downwardly extending inclined members 32.

Struts 23 are preferably employed for supporting the boom in a substantially vertical position. These struts are pivotally connected to the boom and to the frame of the automobile truck and comprise two telescoping sections whereby the boom may be moved into a lower inclined position, as indicated in dotted lines in Figure 1, when the truck is in transit. In this way, it is possible to provide a boom of a height sufficient to enable the elevator to be raised high enough that ice may be transferred therefrom to the top of a railroad refrigerator car and yet the boom is capable of occupying such a position when the truck is in transit that it will not extend above the clearance limits of bridges passing over highways.

One of the telescoping sections of each of the struts 33 is pivotally connected to a bracket 34 rigid with the upright members 23 of the boom while the other of the telescoping sections is pivotally connected to a shaft 35 which extends transversely of the frame of the automobile truck and may be advantageously secured thereto by U bolts 36.

The boom may be supported in its inclined position by the member 27 thereof resting upon the upper edges of the side walls of the truck body or should the side walls not be at the desired height then any suitable bracket or the like (not shown) may be secured to the outer face of the side walls for supporting the boom in the desired inclined position.

One end of the flexible means 22 for raising the elevator is preferably wound around a drum or the like 37 mounted upon a jack shaft 38 which is adapted to be driven through the usual means (not shown) by the engine of the automobile truck. The other end of the flexible means is preferably provided with a hook 39, or other means, enabling it to be detachably connected to an eye or the like 40 rigid with the lifting frame of the elevator at the point of intersection of the diagonal members 16. When connected to the elevator and the boom is in its upright position, it will be apparent that upon suitable operation of the jack shaft 38 the flexible means is caused to raise the elevator to the desired point.

In addition to its function of operating the elevator, the flexible means is also adapted to raise the boom from its inclined to its vertical position. This is accomplished by disconnecting the hook end of the flexible means from the elevator and connecting it to a suitable portion of the boom, such, for example, as the U-shaped bracket 41 on the transverse member 27 of the boom. The flexible means is shown connected to the boom in the dotted line position illustrated in Figure 1 and it will be obvious that when thus connected rotation of the jack shaft 38 in the proper direction will cause the boom to move upwardly into the upright position shown in full lines in Figure 1. When operated to move the boom, the flexible means is supported in a position in which it will not foul the elevator by a pulley 42 mounted on the upper end of a standard or post 43.

From the foregoing, it will be perceived that I have devised simple and reliable means whereby ice may be elevated from an automobile truck to a position such that it may be easily transferred on to the roof of a refrigerator car. Various modifications in the details of the particular embodiment of the invention illustrated in the drawings may be made without departing from the spirit and scope of the invention as defined in the appended claims.

What I claim is:

1. A portable ice hoisting apparatus for an automobile truck, said apparatus comprising a vertically movable elevator, a pivotally mounted boom adapted to occupy a substantially vertical position adjacent said elevator when the elevator is in use, said boom being movable rearwardly to a lower inclined position when the elevator is not in use and having a forwardly extending portion which is disposed above the elevator when the boom is in its vertical position, and power operated flexible means supported by the said portion of the boom, one end of said flexible means being adapted to be connected to said elevator when the boom is in its vertical position so that the elevator may be raised and being also adapted to be connected to said boom when the latter is in its inclined position whereby the boom may be raised to said vertical position.

2. A portable ice hoisting apparatus for an automobile truck, said apparatus comprising a vertically movable elevator, tubular members affording guides for said elevator, means rigid with the automobile truck having upright portions on which said tubular members are telescopically mounted, a boom pivotally mounted on the automobile truck adapted to occupy a substantially vertical position adjacent said elevator when the latter is in use and being movable rearwardly to a lower inclined position when the elevator is not in use, and power operated flexible means supported by said boom, one end of said flexible means being adapted to be selectively connected to said elevator or to said boom whereby when the boom is in its vertical position the flexible means may be operated to raise the elevator and when the boom is in its lower inclined position the flexible means may be operated to raise the boom to its vertical position.

3. A portable ice hoisting apparatus for an automobile truck, said apparatus comprising a vertically movable elevator, a pivotally mounted boom adapted to occupy a substantially vertical position adjacent said elevator when the elevator is in use, said boom being movable rearwardly to a lower inclined position when the elevator is not in use and having a forwardly extending portion disposed above said elevator when the boom is in its vertical position, a pulley mounted on said forwardly extending portion, and power operated flexible means passing around said pulley, one end of said flexible means being adapted to be selectively connected to said elevator or to said boom whereby when the boom is in its vertical position the flexible means may be operated to raise the elevator and when the boom is in its lower inclined position the flexible means may be operated to raise the boom to its vertical position.

4. A portable ice hoisting apparatus for an automobile truck, said apparatus comprising a vertically movable elevator, a pivotally mounted boom adapted to occupy a substantially vertical position adjacent said elevator when the latter is in use, said boom being movable rearwardly to a lower inclined position when the elevator is not in use, a strut for supporting the boom in said vertical position, said strut involving telescoping sections respectively pivoted to the automobile truck and to the boom, and power operated flexible means supported by said boom, one end of said flexible means being adapted to be selectively connected to said elevator or to said boom whereby when the boom is in its vertical position the flexible means may be operated to raise the elevator and when the boom is in its lower inclined position the flexible means may be operated to raise the boom to its vertical position.

5. A portable ice hoisting apparatus for an automobile truck, said apparatus comprising a vertically movable elevator, a plurality of upright members rigid with the truck, tubular members slidably mounted on said upright members, means rigid with the elevator and slidably cooperable with said tubular members for guiding the elevator during the first part of its upward movement, said means being also adapted during a later part of the upward movement to cause the tubular members to move upwardly with said elevator and with respect to said upright members for guiding the elevator, a boom pivotally mounted on the automobile truck, and power operated flexible means supported by said boom for raising said elevator.

6. A portable ice hoisting apparatus for an automobile truck, said apparatus comprising a vertically movable elevator provided with a platform on which ice is adapted to be loaded, a boom pivotally mounted on the automobile truck, power operated flexible means supported by said boom for raising said elevator, and means movable with and pivoted to said elevator adapted to form lateral extensions of said platform over which ice may be slid from the platform after the elevator has been raised, said extensions being disposed in substantially vertical positions when the elevator is in its lowest position.

CARL A. JOHNSON.